US009437031B2

(12) United States Patent
Everitt

(10) Patent No.: US 9,437,031 B2
(45) Date of Patent: Sep. 6, 2016

(54) VIRTUAL MEMORY BASED NOISE TEXTURES

(75) Inventor: Cass W Everitt, Pflugerville, TX (US)

(73) Assignee: NVIDIA Corporation, Santa Clara, CA (US)

( * ) Notice: Subject to any disclaimer, the term of this patent is extended or adjusted under 35 U.S.C. 154(b) by 532 days.

(21) Appl. No.: 11/522,022

(22) Filed: Sep. 15, 2006

(65) Prior Publication Data

US 2008/0068394 A1   Mar. 20, 2008

(51) Int. Cl.
*G06T 15/00* (2011.01)
*G06T 1/60* (2006.01)

(52) U.S. Cl.
CPC ............... *G06T 15/005* (2013.01); *G06T 1/60* (2013.01)

(58) Field of Classification Search
USPC ....... 345/543, 537, 538, 552, 568, 582, 564; 711/200, 203, 206, 207, 205, 208, 209
See application file for complete search history.

(56) References Cited

U.S. PATENT DOCUMENTS

| | | | |
|---|---|---|---|
| 5,611,064 A * | 3/1997 | Maund et al. ................ | 711/209 |
| 6,496,882 B2 * | 12/2002 | Iverson ........................... | 710/68 |
| 6,560,688 B1 * | 5/2003 | Strongin et al. .............. | 711/203 |
| 7,065,630 B1 * | 6/2006 | Ledebohm et al. .......... | 711/206 |
| 7,383,412 B1 * | 6/2008 | Diard ............................ | 711/170 |
| 2006/0092165 A1 * | 5/2006 | Abdalla et al. ............... | 345/545 |
| 2006/0117162 A1 * | 6/2006 | Sauber .......................... | 711/203 |
| 2007/0033318 A1 * | 2/2007 | Gilday et al. ..................... | 711/3 |
| 2008/0005489 A1 * | 1/2008 | Watkins et al. ............... | 711/147 |

* cited by examiner

*Primary Examiner* — Maurice L McDowell, Jr.
*Assistant Examiner* — Donna J Ricks
(74) *Attorney, Agent, or Firm* — Artegis Law Group, LLP

(57) ABSTRACT

A large non-patterned noise texture occupies a relatively small physical memory space. Each of a small set of physical pages in physical memory includes noise texels forming part of a noise texture. A large "virtual" noise texture is created by mapping each one of a large number of pages in virtual address space to one of the small set of physical pages; multiple virtual pages may be mapped to the same physical page. The physical page that each virtual page maps to is randomly or pseudo-randomly selected such that the resulting noise texture appears to be non-repeating. When a noise texel is requested by reference to a virtual address during rendering, the virtual address of the virtual page is translated to the corresponding physical address, and the noise texel is retrieved.

23 Claims, 4 Drawing Sheets

VIRTUAL MEMORY BASED NOISE TEXTURES

BACKGROUND OF THE INVENTION

The present invention relates generally to a virtual memory subsystem and more specifically to the representation of a noise texture function that occupies a small physical memory footprint in a larger virtual memory space.

In the field of computer graphics, achieving realism is a challenge. Sophisticated rendering techniques including procedural (or algorithmic) shading have been developed in an effort to make rendered objects appear more realistic. Such techniques often include the introduction of "noise" into rendered surfaces to create small, random-seeming variations in colors, surface normals, or the like, that make rendered objects appear more natural.

In procedural graphics, noise is introduced by using a noise function, which is typically a continuous pseudo-random function whose behavior has no discernible pattern but which, for a given set of inputs, returns the same value. The function may be defined in one or more dimensions, but most commonly, the function is defined in three or four dimensions, matching the dimensionality of coordinate systems used in 3-D rendering. The noise function provides the basis for procedures that produce impressive visual effects and graphical objects by adding irregular variations to objects representing such things as clouds, water, fire, stone, terrain, etc. Noise can also be used to alter animations, line drawings, music, and the like, where small variations from a perfectly smooth value create a more natural look or sound.

Procedural noise generation is slow and consumes substantial computational resources. Real time rendering applications, such as video games, are unable to generate noise functions on the fly. Instead, a noise texture is generated in advance from a noise function, and the noise texture is mapped onto objects in an image in real time using standard texture techniques. The noise texture is generally a pattern that occupies a small memory area. The pattern is repeated (wrapped) at boundaries when the texture is applied to a larger area. The repeating character of the pattern, however, may create visual artifacts in the rendered image, detracting from the desired realism. One possible solution is to create a larger noise texture so that wrapping can be avoided. In practice, however, a sufficiently large noise texture exceeds the physical memory resources available in most computer systems. It would therefore be desirable to provide a noise texture that avoided visible repetition without straining system resources.

BRIEF SUMMARY OF THE INVENTION

Embodiments of the present invention provide a large non-patterned noise texture that occupies a relatively small physical memory space. Each of a small set of physical pages in physical memory includes noise texels forming part of a noise texture. A large "virtual" noise texture is created by mapping each one of a large number of pages in a virtual address space to one of the small set of physical pages; multiple virtual pages may be mapped to the same physical page. The physical page that each virtual page maps to is randomly or pseudo-randomly selected such that the resulting noise texture appears to be non-repeating. When a noise texel is requested by reference to a virtual address during rendering, the virtual address of the virtual page is translated to the corresponding physical address, and the noise texel is retrieved.

One embodiment of the present invention provides a method for providing a noise texture. Noise texture data comprising a plurality of noise texels is stored in a plurality of physical pages in physical memory. A plurality of virtual pages in virtual memory is mapped to the physical pages in the physical memory. The number of virtual pages exceeds the number of physical pages, and multiple virtual pages are mapped to the same physical page. A request for a noise texel identified by reference to a virtual address is received. The virtual address for the requested noise texel is translated, by reference to the mapping, into a corresponding physical address for the physical page. The requested noise texel is retrieved from the physical memory using the physical address.

Another embodiment of the present invention provides a memory system for storing a noise texture function. The memory system includes a physical memory region and an address map. The physical memory region includes a plurality of physical pages. Each physical page stores a pattern of noise texels. The address map is adapted to store a mapping of a plurality of virtual pages in a virtual address space to the physical pages in the physical memory space. The number of virtual pages exceeds the number of physical pages, and multiple virtual pages are mapped to the same physical page.

A better understanding of the nature and advantages of the present invention may be gained with reference to the following detailed description and the accompanying drawings.

DETAILED DESCRIPTION OF THE INVENTION

Figure 1:
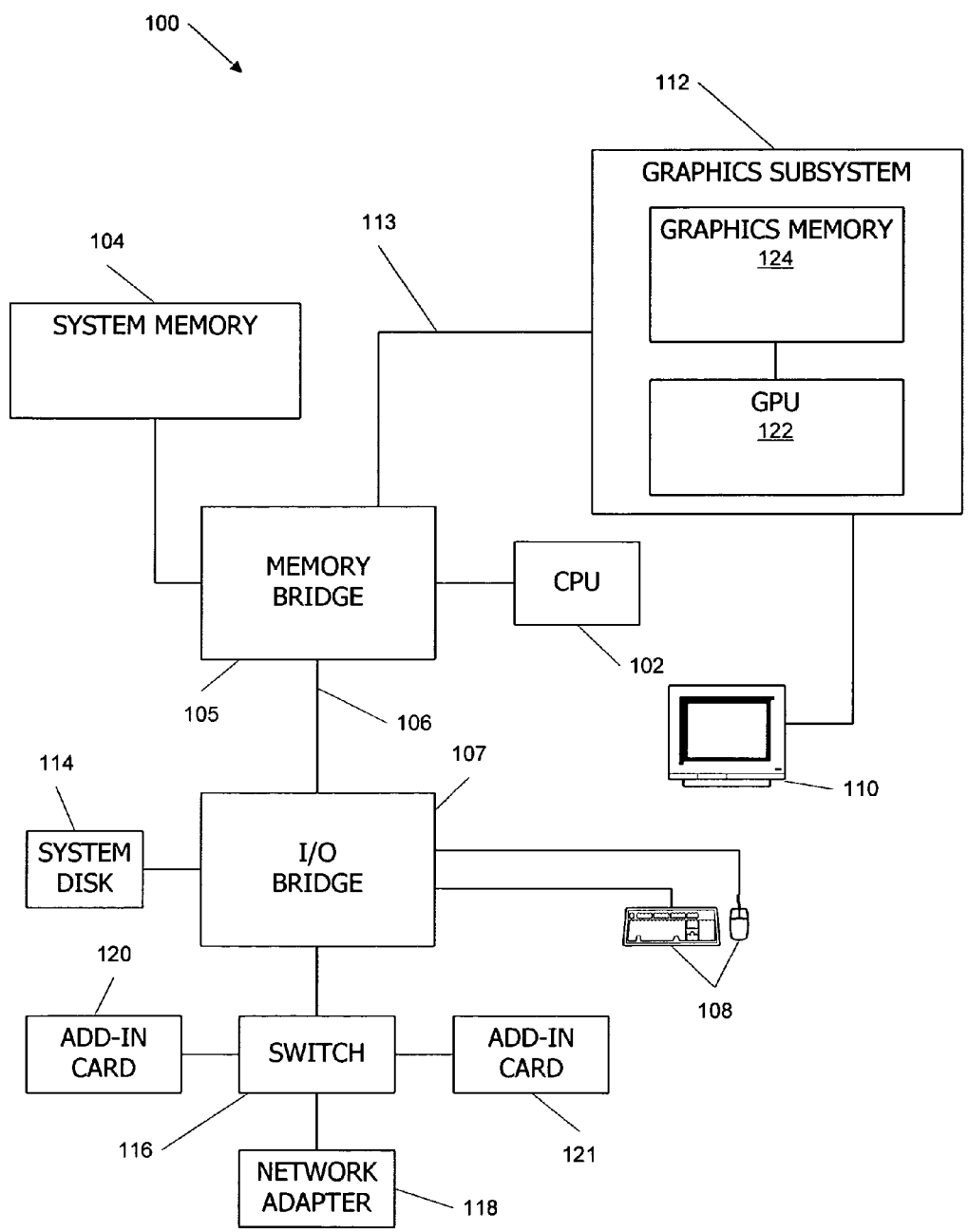
FIG. 1 is a block diagram of a computing system that is improved by incorporating an embodiment of the present invention.

FIG. 1 is a block diagram of a computing system that is improved by incorporating an embodiment of the present invention. Computing system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 and graphics memory 124 are discussed in further detail below.

In operation, CPU 102 is the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102, as is known in the art.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107. A GPU may be provided with any amount of local graphics memory, including no local memory, and may use local memory and system memory in any combination. It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Figure 2:
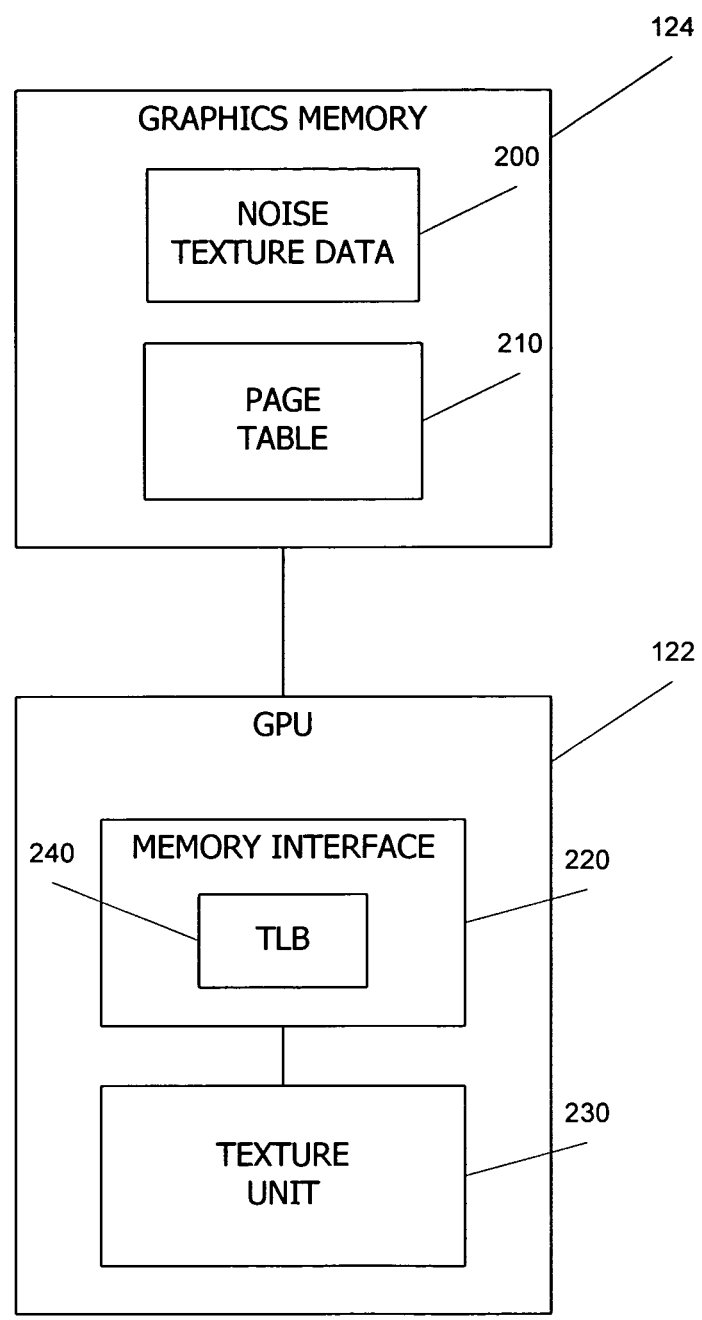
FIG. 2 is a block diagram showing details of a graphics subsystem according to an embodiment of the present invention.

FIG. 2 is a block diagram showing further details of graphics subsystem 112 according to an embodiment of the present invention. Graphics memory 124 is coupled to GPU 122 in the graphics subsystem. Graphics memory 124 includes noise texture data 200 and a virtual-to-physical address map (e.g., a page table) 210. GPU 122 includes a memory interface 220 and a texture unit 230. Memory interface 220 includes a translation lookaside buffer (TLB) 240.

GPU 122 uses virtual addressing to access at least a portion of graphics memory 124, in particular, the portion containing noise texture data 200. As is known in the art, virtual addressing is an indirect memory access technique, in which program code executed by a processor specifies "virtual" memory addresses that are not permanently tied to any physical memory location. This allows, for instance, the program to treat a block of virtual memory as being contiguous regardless of whether the data is actually stored contiguously. In memory systems that support page swapping, virtual addressing also allows the program to use an address space larger than the size of the available physical memory; data is swapped between primary memory and secondary storage (e.g., hard disk) as needed.

In graphics subsystem 112, virtual-to-physical address mappings for at least a portion of graphics memory 124 are maintained in page table 210. When GPU 122 requests access to graphics memory 124, memory interface 220 determines whether the requested address is physical or virtual. If the address is virtual, memory interface 220 forwards the virtual address to TLB 240 for translation. TLB 240, which may be of conventional design, accesses page table 210 to obtain the physical address corresponding to the requested virtual address, and memory interface 220 uses the physical address to access the data stored in graphics memory 124. In some embodiments, TLB 240 may include a cache of recently accessed page table entries and may be able to satisfy some translation requests from its cache. Suitable TLB designs are known in the art, and a detailed description is omitted as not being critical to understanding the present invention.

Noise texture data 200 is created in advance of rendering operations (e.g., by the programmer or procedurally during application start-up). As is known in the art, a texture is defined by assigning a value to each point in a coordinate space (which may be, for example, two-dimensional or three-dimensional). The value is associated with an attribute of a graphics primitive such as a color or a surface normal. The texture is represented as a sample value associated with each of a finite set of sample points in the texture coordinate space. The sample values are called "texels." When a texture is stored in memory, the texels are advantageously arranged so as to facilitate the mapping of texture coordinates into memory addresses.

The noise texture may be generated using conventional techniques, including procedural techniques. The noise texture may be generated as a continuous function such that each physical page corresponds to a contiguous region in the texture coordinate space. In one embodiment, a physical page is 4 KB; if each texel is a 32-bit value, each page includes 1K texels; other page sizes and texel sizes may be substituted. At the edge of each such region, the noise texture advantageously conforms to a common value (e.g., zero). As described below, having a common value at the edge of each region guarantees continuous noise textures.

During rendering, an object to be rendered can be mapped to the noise texture such that each point on the object is mapped to a point in the noise texture coordinate space. Within a rendering pipeline of GPU 122, texture unit 230 uses the mapping to identify a noise texel (or multiple noise texels) for each pixel. The corresponding noise texel(s) is (are) fetched from graphics memory 124 and blended with other data associated with the pixel (which may include texels from other textures) to contribute to the final pixel color. Conventional texture blending techniques may be used.

In accordance with an embodiment of the present invention, for noise texture 200, texture unit 230 identifies noise texels to be fetched using virtual addresses. Memory interface 220 translates the virtual addresses to physical addresses using TLB 240 and fetches the appropriate texels of noise texture data 200 using the physical addresses. The virtual address space representing the noise texture is advantageously made significantly larger than the physical memory used to store noise texture data 200. Multiple virtual addresses map to the same physical memory locations. The mapping is advantageously designed such that no visible repetitive pattern is created.

Figure 3:
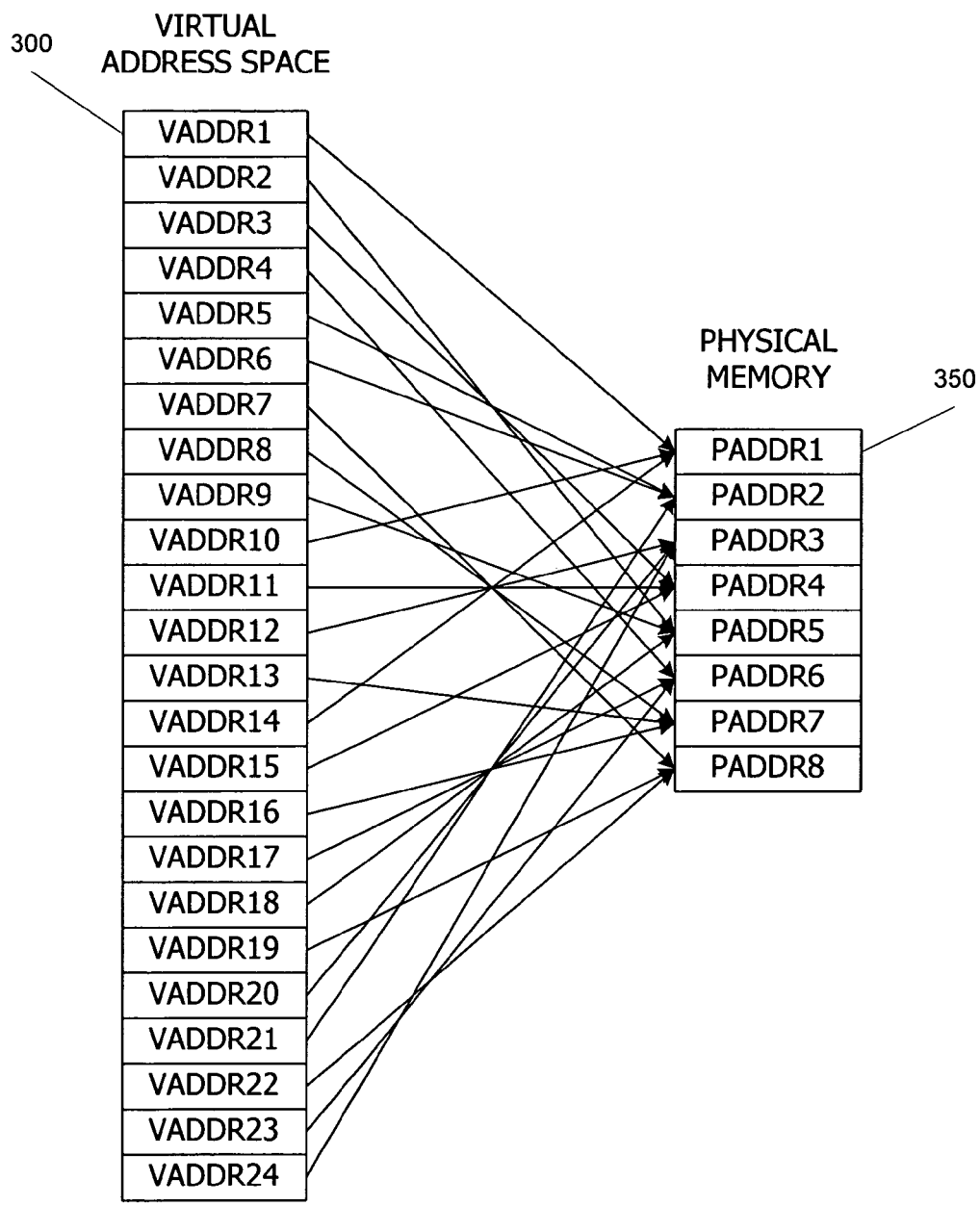
FIG. 3 is a block diagram of a mapping of virtual addresses to physical addresses for a noise texture according to an embodiment of the present invention.

FIG. 3 is a block diagram of a mapping of virtual addresses to physical addresses for a noise texture according to an embodiment of the present invention. FIG. 3 shows a virtual memory region 300 in virtual address space that is assigned to represent a noise texture. Virtual memory region 300 includes some number of virtual addresses (VADDR1-VADDR24), each corresponding to a page of virtual memory. FIG. 3 also shows a physical memory region 350 that is used to store noise texture data 200. Physical memory region 350 can be, for example, a portion of graphics memory 124 (or other memory) that stores noise texture data 200. Physical memory region 350 includes a number of physical pages. The physical pages are identified by addresses PADDR1-PADDR8 but the physical pages need not be contiguous. The ratio of the number of pages in virtual memory region 300 that are mapped to the number of pages in physical memory region 350 may be any ratio that is larger than 1:1.

Each page of virtual memory in virtual memory region 300 is mapped to one physical page in physical memory region 350. In one embodiment, a mapping is defined for each 4 KB page in virtual memory region 300; other page sizes and other granularities of mapping may be substituted. Multiple pages in virtual memory region 300 may map to the same physical page. For example, virtual pages identified by virtual addresses VADDR1, VADDR10, and VADDR14 are mapped to the physical page identified by physical address PADDR1. Because many virtual pages map to the same physical page, the resulting large virtual texture does not have a correspondingly large footprint in physical memory. If each physical page corresponds to a contiguous region in noise texture coordinate space, and the noise texels at the edge of each region always conform to a common value (e.g., zero), the noise texture will be continuous regardless of the mapping.

The mapping of virtual pages to physical pages is random (or pseudo-random), as shown by the arrows, such that virtual memory region 300 includes an apparently random arrangement of noise texels. In other words, for each virtual page a corresponding physical page is randomly (or pseudo-randomly) selected, and each selection is advantageously independent of all other selections. The random ordering of the physical pages causes the resulting virtual noise texture to have a non-repeating appearance. In one embodiment, each physical page typically maps to many virtual pages. However, due to the random nature of the mapping, a physical page might map to only one virtual page or a physical page might not map to any virtual pages. Once established, the mapping is advantageously preserved so that the same noise texture will be applied to an object from one image to the next.

FIG. 3 is illustrative, and variations and modifications are possible. For instance, the number of physical pages, the number of virtual pages, and the ratio of virtual pages to physical pages can be larger or smaller as those shown. When noise texels are requested to render an object, the virtual address of each virtual page is translated to the corresponding physical address to retrieve the noise texels from the physical pages.

Figure 4:
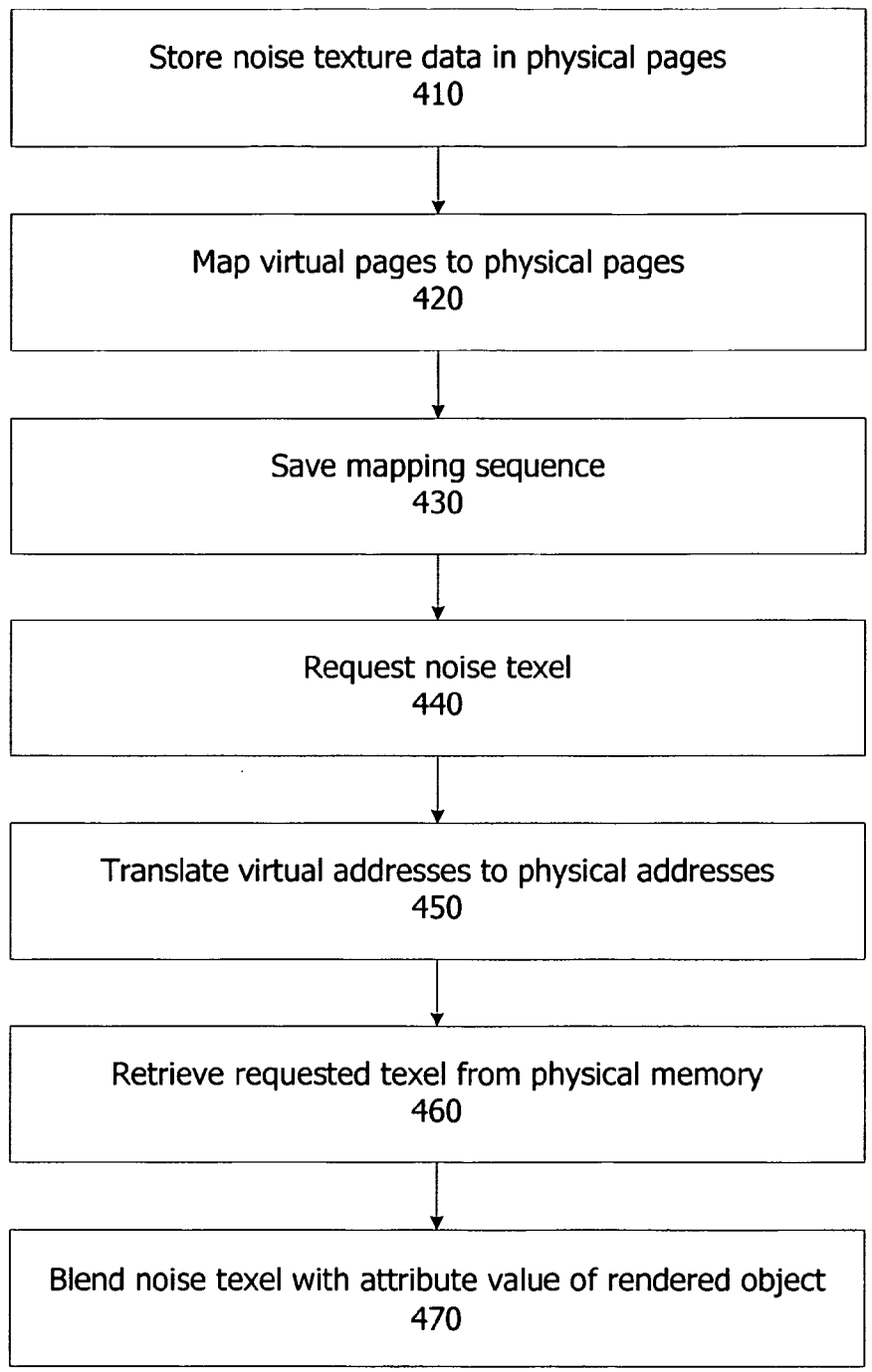
FIG. 4 is a flowchart illustrating a method of applying virtual memory based noise textures using virtual address space according to an embodiment of the present invention.

FIG. 4 is a flowchart illustrating a method of applying a virtual memory based noise texture defined using virtual memory region 300 of FIG. 3 according to an embodiment of the present invention.

Noise texture data 200 (FIG. 2) is stored in physical pages in physical memory region 350 (FIG. 3) at operation 410. Noise texture data 200 can be generated using conventional procedural techniques for generating noise textures. As described above, each physical page advantageously stores a different set of noise texels.

Virtual pages in region 300 of FIG. 3 are mapped to the physical pages in region 350 at operation 420. As described above, each virtual page is mapped to one randomly selected physical page such that a visible repetitive pattern is not created even though the number of virtual pages exceeds the number of physical pages and different virtual pages map to the same physical page.

The mapping of virtual pages to physical pages is saved at operation 430. The saved mapping allows the same noise texture to be reproduced when the noise texture is subsequently requested, e.g., during a different rendering cycle. In one embodiment, the saved mapping may be stored (e.g., on disk) when the program exits and retrieved when the program subsequently executes to reproduce the same noise texture.

During rendering, at operation 440, texture unit 230 of FIG. 2 requests a noise texel by reference to its virtual address. Memory interface 220 uses TLB 240 to translate the requested virtual addresses to the corresponding physical address (e.g., by reference to the mapping of FIG. 3) at operation 450. Memory interface 220 then retrieves the texel from graphics memory 124 at operation 460. In some embodiments, multiple texels may be requested and retrieved in parallel or sequentially. Texture unit 230 blends the noise texel with an attribute value of an object being rendered at operation 470. Example attribute values include line, color, reflectivity, transparency, and surface normal. The blending operation advantageously creates small irregular variations in the attribute value across the surface of the object.

It will be appreciated that the process shown in FIG. 4 is illustrative and that variations and modifications are possible. Steps described as sequential may be executed in parallel, order of steps may be varied, and steps may be modified or combined. Rendering operations 440, 450 and 460 may be performed for each pixel of each object being rendered.

While the present invention has been described with respect to particular embodiments and specific examples thereof, it should be understood that other embodiments also fall within the spirit and scope of the invention. For instance, the amount of physical memory used for noise textures can be any portion of physical memory. The ratio of virtual pages to physical pages can be any ratio greater than 1:1. The size of the physical page can be as small as to include one noise texel and as large as to include any number of noise texels. The physical memory storing the noise texture can be in any available memory system, including, e.g., graphics memory or main system memory. The noise texture may be generated by a variety of different techniques including but not limited to conventional procedural techniques. The noise texture may be applied to any desirable pixel attribute, in addition to or instead of attributes specifically mentioned herein. The same set of physical pages could be used with a different virtual address mapping (e.g., in a different sequence) to create multiple, uncorrelated noise textures. One noise texture could then be applied to one attribute (e.g., color) and a different noise texture could be applied to another attribute (e.g., surface normal) without requiring more physical memory.

Further, while embodiments described herein may make reference to specific hardware and/or software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as compact disc (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, the scope of the invention should, therefore, be determined with reference to the appended claims along with their full scope of equivalents.

What is claimed is:

1. A method for providing a noise texture, the method comprising:
   storing noise texture data comprising a plurality of noise texels in a plurality of physical pages in physical memory;
   mapping, via a graphics processing unit, a plurality of virtual pages in a virtual address space to a first physical page included in the plurality of physical pages, wherein the first physical page includes at least one noise texel included in the plurality of noise texels and multiple virtual addresses in the virtual address space are mapped to the same physical address at the same time;
   receiving a request for a noise texel identified by reference to a virtual address;
   translating, by reference to the mapping, the virtual address for the requested noise texel into a corresponding physical address;
   retrieving the requested noise texel from the physical memory using the physical address;
   rendering a pixel using the requested noise texel; and
   providing the pixel to a display device.

2. The method of claim 1 further comprising blending the retrieved noise texel with an attribute value of a pixel associated with an object to be rendered such that irregular variations are produced in the attribute value.

3. The method of claim 1 wherein mapping the virtual pages to the physical pages results in a virtual noise texture that has a non-repeating appearance.

4. The method of claim 3 wherein mapping the virtual pages to the physical pages comprises randomly mapping the virtual pages to the physical pages.

5. The method of claim 1 wherein mapping the virtual pages to the physical pages further comprises defining a contiguous region in virtual memory space as representing a noise texture.

6. The method of claim 1 further comprising saving the mapping of virtual pages to physical pages so that the same noise texel is reproduced when subsequently requested.

7. The method of claim 1 wherein each physical page corresponds to a contiguous region of a noise texture coordinate space comprising a plurality of noise texels, and wherein noise texels at edges of each region conform to a common value.

8. The method of claim 1 wherein each physical page stores a plurality of noise texels such that a different noise texture pattern is formed on each physical page.

9. The method of claim 1 further comprising generating the noise texels by applying a procedural noise function.

10. The method of claim 1 wherein the noise texture is a volumetric noise texture.

11. A graphics system comprising:
    a physical memory region having a plurality of physical pages, wherein each physical page stores a pattern of noise texels;
    an address map adapted to store a mapping of a plurality of virtual pages in a virtual address space to a first physical page included in the plurality of physical pages, wherein the first physical page includes at least one noise texel included in the plurality of noise texels and multiple virtual addresses in the virtual address space are simultaneously mapped to the same physical address; and
    a graphics pipeline to render pixels using the noise texels and to provide the pixels to a display device.

12. The graphics system of claim 11 wherein the plurality of virtual pages is randomly mapped to the physical pages.

13. The graphics system of claim 11 further comprising a memory interface configured to:
    receive a request for a noise texel identified by a virtual address in one of the plurality of virtual pages;
    translate the virtual address into a corresponding physical address of one of the plurality of physical pages by referencing the address map; and
    retrieve the noise texel from the physical memory region using the corresponding physical address.

14. The graphics system of claim 13, wherein the memory interface is coupled to a texture unit configured to request the noise texel from the memory interface and to blend the retrieved noise texel with an attribute value of a pixel associated with an object to be rendered such that irregular variations are produced in the attribute value.

15. The graphics system of claim 11 wherein the address map comprises a plurality of entries in a page table.

16. The graphics system of claim 11, wherein each physical page stores a plurality of different noise texels such that a different noise texture pattern is formed on each physical page.

17. The graphics system of claim 11 wherein each physical page corresponds to a contiguous region of a noise texture coordinate space, and wherein noise texels at edges of each region conform to a common value.

18. A non-transitory computer-readable storage medium including instructions that, when executed by a processor, cause the processor to provide a noise texture by performing the steps of:

storing noise texture data comprising a plurality of noise texels in a plurality of physical pages in physical memory;

mapping, via a graphics processing unit, a plurality of virtual pages in a virtual address space to a first physical page included in the plurality of physical pages, wherein the first physical page includes at least one noise texel included in the plurality of noise texels and multiple virtual addresses in the virtual address space are simultaneously mapped to the same physical address;

receiving a request for a noise texel identified by reference to a virtual address;

translating, by reference to the mapping, the virtual address for the requested noise texel into a corresponding physical address;

retrieving the requested noise texel from the physical memory using the physical address; and blending the retrieved noise texel with an attribute value of a pixel associated with an object to be rendered.

19. The non-transitory computer-readable storage medium of claim 18 wherein mapping the virtual pages to the physical pages results in a virtual noise texture that has a non-repeating appearance.

20. The non-transitory computer-readable storage medium of claim 19 wherein mapping the virtual pages to the physical pages comprises randomly mapping the virtual pages to the physical pages.

21. The method of claim 1 further comprising:
displaying the pixel using the display device.

22. The method of claim 1 further comprising randomly or pseudo-randomly selecting the corresponding physical address such that the resulting noise texture appears to be non-repeating.

23. The method of claim 1 further comprising:
receiving a request for multiple noise texels; and
retrieving the multiple noise texels in parallel or sequentially.

* * * * *